United States Patent [19]

Smith et al.

[11] 3,920,695
[45] Nov. 18, 1975

[54] SILICONE-COMPATIBLE INDIGO DYESTUFFS

[75] Inventors: Carl Mayn Smith, White Bear Lake; George Van Dyke Tiers, St. Paul, both of Minn.

[73] Assignee: Minnesota Mining and Manufacturing Company, St. Paul, Minn.

[22] Filed: Aug. 28, 1974

[21] Appl. No.: 501,212

Related U.S. Application Data

[62] Division of Ser. No. 275,190, July 26, 1972.

[52] U.S. Cl. ............... 260/322; 260/323; 260/331; 260/205; 260/378; 260/314.5; 260/396 R
[51] Int. Cl.² ............................................. C09B 7/00
[58] Field of Search .................. 260/322, 323, 331

Primary Examiner—Elbert L. Roberts
Assistant Examiner—S. P. Williams
Attorney, Agent, or Firm—Alexander, Sell, Steldt & DeLaHunt

[57] ABSTRACT

Dyestuffs containing the tris(trimethylsilyloxy)silyalkylamino group,

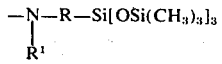

are produced and are found to be compatible with cured silicone polymers.

1 Claim, No Drawings

SILICONE-COMPATIBLE INDIGO DYESTUFFS

This is a division of application Ser. No. 275,190, filed July 26, 1972.

This invention relates to silicone-containing dyestuffs that are compatible with silicone polymers and to the process for preparing the same. More particularly, the invention is concerned with dyestuffs containing the tris(trimethylsilyloxy)silylalkylamino group,

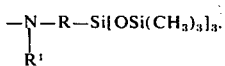

Silicone polymers have been used for many years in a variety of applications because of their stability to a wide range of environmental conditions including high and low temperatures, solvents and water and their excellent electrical characteristics. The polymers may be pigmented but have not been dyed because no readily available dyes have been found that are compatible with them. The present invention is based on the discovery of a class of hydrolytically stable, readily available dyes containing a high percentage of silicon that are compatible with silicone polymers.

A limited range of dyestuffs containing silicon are disclosed in the art. Such dyestuffs are generally prepared by the reaction of an aminoalkyl silane such as, for example, 3-aminopropyltriethoxysilane with suitable dye intermediates. Thus, Bailey and Pike in a series of U.S. Pat. Nos. 2,955,898; 2,955,899 and 2,963,338, teach the preparation of silicon-containing thiazine dyes, silicon-containing triarylmethane dyes and silicon-containing azo triazine dyes, respectively, by the reaction of a corresponding dyestuff intermediate with an aminoalkyl silane. The preparation of azo dyes containing an aminoalkyl silyl group is taught in U.S. Pat. Nos. 2,929,313; 2,927,839; 2,931,693 and 2,957,744 also issued to Bailey and Pike. These may or may not be polymerized to a polysiloxane. Hemzawi and Jones, J. Soc. Dyers and Colourists 85 (9), 401 (1969), describe the preparation of anthraquinone dyes containing aminoalkyl silane groups such as 3-aminopropyltriethoxysilane groups. None of the silicon-containing dyes disclosed in the foregoing references are compatible with cured silicone resins. Many are soluble in organic solvents, e.g., heptane, and low molecular weight silanes, but, when solutions of the silane containing the silicon-containing dyes are cured, syneresis forces the dye from the silicone so that completely undyed cured silicone resins are obtained.

Andrianov et al., J. Organometallic Chemistry 12, 63(1968) describes dyes prepared by diazotizing an aminoarylethylheptamethyl cyclotetrasiloxane and coupling the diazotized compound with a coupling agent. The aminoarylethylheptamethyl cyclotetrasiloxane is obtained by reduction of nitroarylethylheptamethyl cyclotetrasiloxane which in turn is obtained by condensation of nitrostyrene with heptamethyl cyclotetrasiloxane. According to Sokolov, Zhur. Obshchei Khim. 29, 248(1959); Chem. Abs. 53, 21621f (1959), heptamethyl cyclotetrasiloxane is obtained along with many other silanes by the co-hydrolysis of dichlorodimethylsilane and dichloromethylhydrosilane. The preparation of azo dyestuffs having an ethylheptamethyl cyclotetrasilane is therefore an involved and costly process. The compatibility of these dyestuffs with silicones may be conjectured.

It is an object of this invention to provide silicon-containing dyestuffs that are compatible with cross-linked silicones.

It is another object to provide silicon-containing dyestuffs that may be synthesized in good yields by a relatively simple process.

Another object is to provide cured silicone polymers containing compatible dyestuffs.

Other objects of the invention will in part be obvious and will in part appear hereinafter.

The dyestuffs of this invention are dyestuffs valuable in being compatible with cross-linked silicone polymers. They are structurally characterized by having, for each two aromatic rings within the dye molecule, at least one tris(trimethylsiloxy)silylalkyl group having the formula:

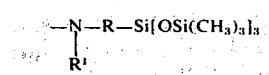    I wherein R is a straight or branched chain lower alkylene group having 1 to 6 carbon atoms and $R^1$ is hydrogen or unsubstituted lower alkyl group having 1 to 6 carbon atoms. In certain molecules a linking sulfonyl group is employed for convenience in synthesis. The dyes of the invention are quinones of one to three aromatic rings with at least one tris(trimethylsiloxy)silylalkyl group, or indigos or thioindigos or phthalocyanines with at least three tris(trimethylsiloxy)silylalkyl sulfonyl groups as represented by formulae II through VII in which $R^2$ is H or tris(trimethylsiloxy)silylalkyl

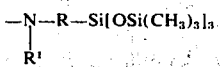

wherein R and $R^1$ are as defined above.

The dyes of the invention have the formulae:

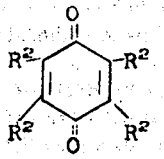 , 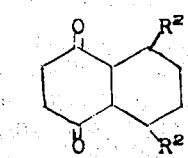 , 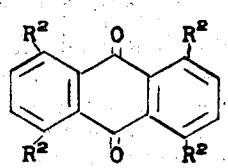

II    III    IV

-continued

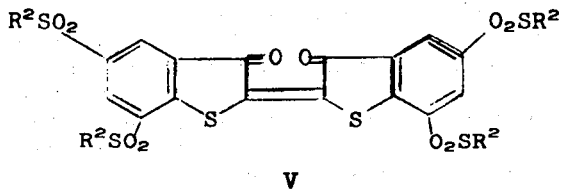

V

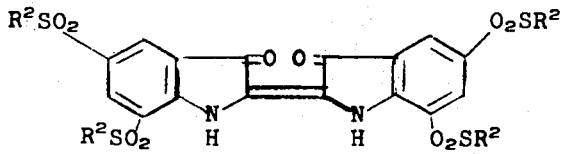

VI

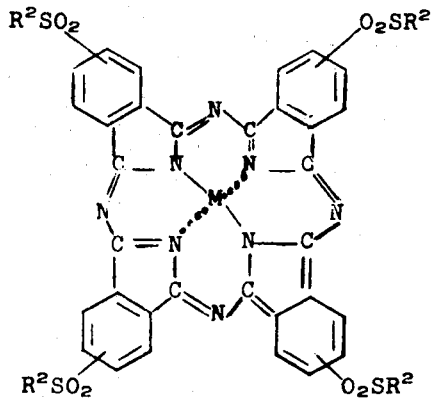

VII

The dyestuffs of the invention are prepared by the reaction of a tris(trimethylsiloxy)silylalkyl amine having the formula:

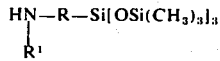

wherein R and $R^1$ are as defined above, with a susceptible chromogenic compound whgich is a hydroxy quinone or certain halosulfonyl poly cyclic heterocyclics.

Suitable tris(trimethylsiloxy)silylalkyl amines for use in the preparation of the dyestuffs of the invention include the following:

3-tris(trimethylsiloxy)silylpropylamine
N-methyl-3-tris(trimethylsiloxy)silylpropylamine
N-ethyl-3-tris(trimethylsiloxy)silylpropylamine
N-propyl-3-tris(trimethylsiloxy)silylpropylamine
N-isopropyl-3-tris(trimethylsiloxy)silylpropylamine
N-butyl-3-tris(trimethylsiloxy)silypropylamine
2-tris(trimethylsiloxy)silylethylamine
N-methyl-2-tris(trimethylsiloxy)silylethylamine
N-ethyl-2-tris(trimethylsiloxy)silylethylamine
N-butyl-2-tris(trimethylsiloxy)silylethylamine
4-tris(trimethylsiloxy)silybutylamine
N-methyl-4-tris(trimethylsiloxy)silylbutylamine
N-methyl-3-tris(trimethylsiloxy)silylbutylamine
N-ethyl-2-tris(trimethylsiloxy)silylbutylamine The tris(trimethylsilyloxy)silylalkylamines are prepared by the reaction of bis(trimethylsilyl)oxides with trialkoxysilylalkylamines in the presence of an alkaline catalyst such as, for example, quaternary ammonium hydroxides, e.g., tetraalkylammonium hydroxides, e.g., tetramethylammonium hydroxide. The reaction proceeds according to the following equation:

wherein R and $R^1$ are as hereinbefore defined and $R^3$ is lower alkyl, i.e., methyl or ethyl. The reaction takes place between about 50° and 200° C. and preferably between about 100° and 150° C. In a preferred method of preparing tris(trimethylsilyloxy)silylalkylamines, one mole of triethoxysilylalkylamine is heated with 3 moles of bis(trimethylsilyl)oxide and about 0.02 moles of tetramethyl ammonium hydroxide (20% in methanol) in an apparatus equipped for vacuum distillation through an efficient fractionating column. The pot is heated to and maintained at about 135° to 140° whereupon methanol and trimethylethoxysilane distills over at between 64° and 99° C. The tris(trimethylsilyloxy)silylalkylamine is isolated from the pot residue generally by vacuum distillation.

Chromogenic compounds as referred to herein are compounds commonly used in the art as dyestuffs or as intermediates for the preparation of dyestuffs. The compounds possess a sufficient number and configuration of unsaturated groups, e.g., C=O, COOH, N=O, $NO_2$, N=N, C=C, C≡C, C=S, etc., to afford selective absorption of light of wavelengths between about 350 to 700 millimicrons and thereby include compounds absorbing ultraviolet light as well as visible light. The chromogenic compounds useful in the preparation of the dyestuffs of the invention may be any chromogenic compound (dyestuff or dyestuff intermediate) that has an atom or group of atoms susceptible to displacement by or addition of the reactive group of the tris(trimethylsiloxy)silylalkylamine. Particularly useful chromogenic compounds include halosulfonyl derivatives of dyestuffs and certain substituted and unsubstituted quinones.

Halosulfonyl derivatives of dyestuffs suitable for use in the preparation of dyestuffs of the invention are compounds having the general formula:

wherein D represents the residue of a chromogenic compound excluding n replaceable hydrogen atoms, n is an integer having a value from 1 to 6 or more, and X is halogen with atomic weight below about 36 and is preferably chlorine. In particular, D may be an azo-dyestuff, indigo, thioindigo or a phthalocyanine metal complex.

Typical halosulfonyl derivatives of dyestuffs are those halosulfonyl derivatives that are made by halosulfonating dyestuffs so that at least one halosulfonyl group is introduced into the dyestuff molecule for every two aromatic rings and, preferably one for each aromatic ring, without destroying the dyestuff. Halosulfonation to this extent is most feasible with amino or hydroxyl group-containing dyestuffs. Typical halosulfonyl derivatives of dyestuffs that may be used include the sulfonyl halide derivatives of aromatic azo-compounds e.g., 4-azobenzenesulfonylchloride, 4-azobenzenesulfonylfluoride, 2,2'-dimethyl-4-azobenzenesulfonylchloride, 2,2'-dimethoxy-4-azobenzenesulfonylchloride, 3'5-dichloro-2,4'-azobenzenedisulfonylchloride, 3,3'-azobenzenedisulfonylchloride, and 2,2'-dimethyl, 4,4'-azobenzenedisulfonylchloride and sulfonyl halide derivatives of indigo, thioindigo, copper phthalocyanine, nickel phthalocyanine, and cobalt phthalocyanine, such as i.e., 5,5', 7,7'-thioindigotetrasulfonylchloride and copper 3,3',3",3"'-phthalocyaninetetrasulfonylchloride.

The halosulfonyl derivatives of dyestuffs are generally most conveniently prepared by heating the dyestuff in chlorosulfonic acid by conventional procedures. Because the presence of dyestuff sulfonic acid in the reaction product makes the isolation of the dyestuff sulfonylhalide difficult, it is advantageous to convert any sulfonic acid to the sulfonyl chloride by heating the chlorosulfonic acid reaction mixture with thionylchloride (as described, for example, in U.S. Pat. No. 3,057,873) before isolation of the dyestuff sulfonylchloride. The reaction of dyestuff and chlorosulfonic acid may be carried out at about 75° and 150° and preferably 110° to 150°C. for 1 to about 12 hours and preferably about 3 to 5 hours. Generally, the higher the temperature, the shorter the time required to effect reaction. Temperatures higher than 150° up to 175° may be used in closed pressurized systems. Chlorosulfonation is carried out using from about 5 to about 20 parts and preferably about 10 to about 15 parts by weight of chlorosulfonic acid per part of dyestuff. The reaction with thionylchloride may be carried out at 30° to 80°C. for about 6 to 48 hours and preferably at 70° to 80°C for about 10 to 12 hours. The reaction with thionylchloride is carried out, also in parts by weight, using about 0.5 to 5 parts and preferably 1 to 2 parts of thionyl chloride per part of dyestuff initially used.

The silicon-containing dyestuffs of the invention are prepared from the desired dyestuff sulfonylhalide by reaction of one molar equivalent of dyestuff sulfonylhalide with $n$ molar equivalents of tris(trimethylsilyloxy)-silylalkylamine in the presence of an acid receptor. In this instance $n$ is the number of sulfonyl halide groups per molecule. The process is basically that which is well known in the art for the preparation of amides by the reaction of sulfonylhalides with amines. The acid receptor may be an alkali metal carbonate such as sodium carbonate or an alkyl metal hydroxide such as sodium hydroxide. The acid receptor may be excess tris(-trimethylsilyloxy)-silylalkylamine, however, it is preferred that the acid receptor be a tertiary amine such as, for example, pyridine. At least $n$ molar equivalents of acid receptor is used, however, 1.5 $n$ to 10 $n$ molar equivalents or more may be used. The reaction generally takes place by mixing the components of the reaction together using excess acid receptor to provide fluidity to the mixture, however, where the acid receptor is an alkali metal carbonate or hydrate sufficient water (1 to about 5 times the total weight of the other reactants) to produce a readily stirred mixture is used. The reaction mixture is stirred and heated at about 25° to 50°C. for 3 to 24 hours to effect reaction, charged into about an equal volume of water, filtered, washed with water and dried.

Quinone compounds suitable for use in the preparation of dyestuffs of the invention include benzoquinones having at least one unsubstituted alpha position, naphthoquinones and anthraquinones having at least one alpha position substituted by hydroxyl. Such quinone compounds are well known in the art and are available commercially. Typical of the suitable quinone compounds are:

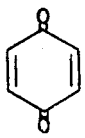 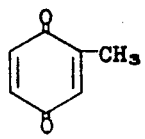

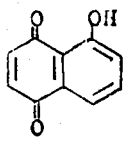 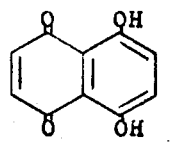

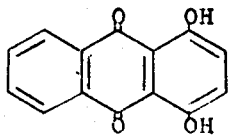, and 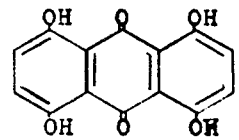

Dyestuffs of the invention are prepared from appropriate quinone derivatives by reaction thereof with 1 to 4 molar equivalents of the tris(trimethylsilyloxy)-silylalkylamine using reactions which are conventional for other less complex amines. Thus, benzoquinone is reacted with 1 to 2 molar equivalents of tris(trimethylsilyloxy)silylalkylamine in a manner similar to that disclosed for the reaction of benzoquinone with amines (see, for example, Karrer, Organic Chemistry, p. 577, Elsevier Publishing Co., Inc., 1950). The hydroxynaphthoquinones and hydroxyanthraquinones are reacted with 1 to 4 molar equivalents of tris(trimethylsilyloxy)-silylalkylamine in the presence of a catalyst such as boric acid or, preferably, in the presence of a reducing agent (whereon the leuco form of the quinone is formed) such as, for example, stannous chloride, stannous acetate, zinc, etc. as is disclosed in Houben, Das Anthracen und die Anthrachinone, p. 427–8, George Thieme Verlag (1929). The reaction is carried out at from 15° to 100° C. in a solvent such as, for examples, ethanol and tetrahydrofuran.

Naphthoquinones and anthraquinones having negative groups other than hydroxyl, i.e., halogen, nitro, and sulfo in the alpha positions of the quinone molecule also may be used in the preparation of crosslinked silicone polymer-compatible dyestuffs of the invention. The negative group substituents on these quinones are replaced by reaction with the tris-trimethylsilyloxy)-silylalkylamine in a manner analogous to that taught by Houben, loc. cit., p. 422–427 for the replacement of negative groups on anthraquinones by amino groups.

This process of preparing the dyestuffs of the invention is not preferred because the use of acid receptors and higher temperatures, i.e., 100° to 200° C., are required to accomplish the reaction. These conditions tend to favor degradation and subsequent polymerization of the tris(trimethylsilyloxy)silyl groups.

Dyestuffs of the invention provide a range of colors useful for incorporation into silicone polymers and which are compatible therewith, that is, the dyestuffs are not expelled from the polymer when it is crosslinked. Illustrative examples of the dyestuffs of the invention and their colors include:

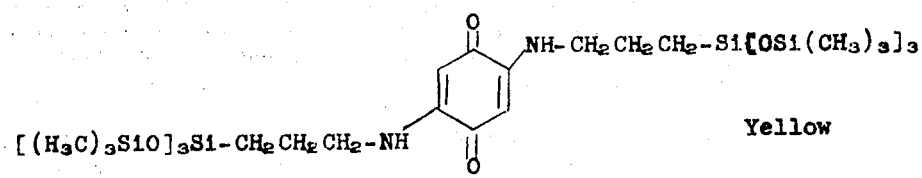

Yellow

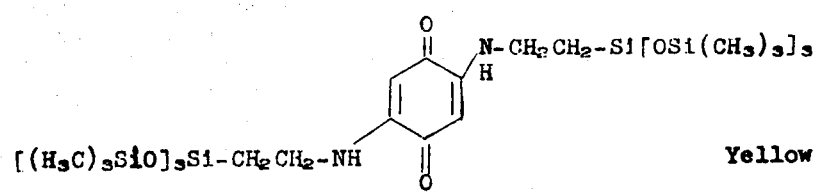

Yellow

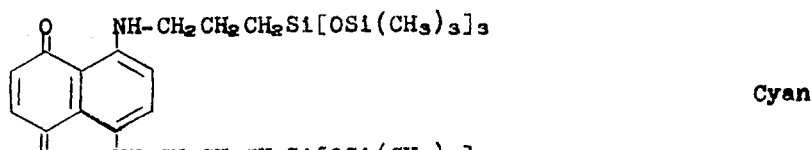

Cyan

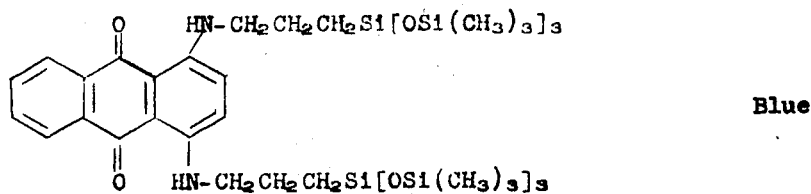

Blue

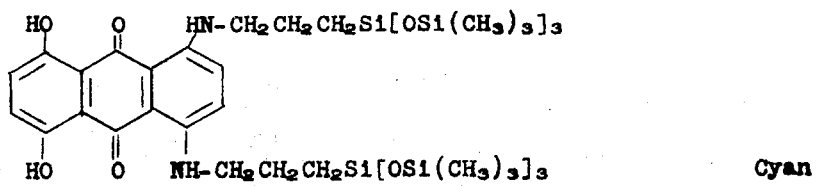

Cyan

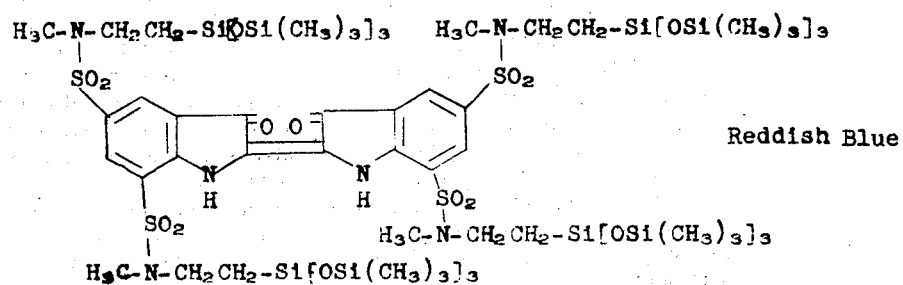

Reddish Blue

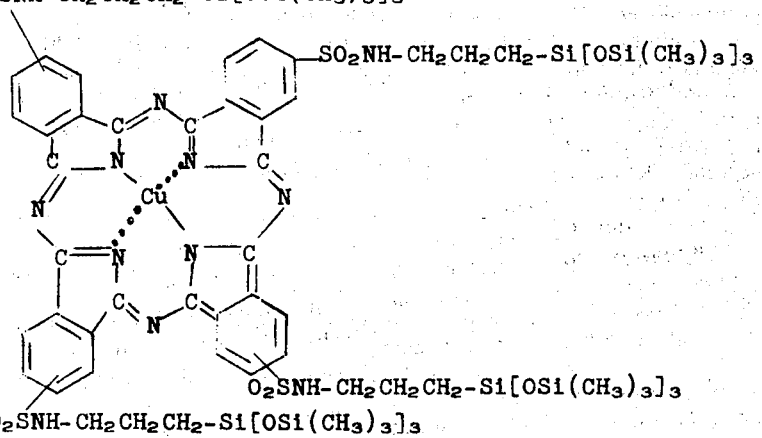

Cyan $O_2SNH-CH_2CH_2CH_2-Si[OSi(CH_3)_3]_3$

Useful silicone polymers which may be crosslinked generally and remain compatible with the dyestuffs of the invention may be selected from a broad family of silicone products including silicone polymers crosslinkable by heating with organic peroxides, e.g., silicone polymers having 0.02 to 0.5 mole-percent of methylvinylsiloxane units; and α, ω-difunctional silicone polymers which may be crosslinked by using polyfunctional crosslinking agents, e.g., hydroxy-terminated polysiloxanes, commonly called "silanol-stopped fluids", crosslinked with polyfunctional crosslinking agents, e.g., methyltrichlorosilane or with certain catalysts with esters of orthosilicic, esters of polysilicic acid, alkyltrialkoxysilanes, and silanes with Si-H bonds. Other suitable difunctional silicone polymers are the diacetoxy-terminated polydimethylsiloxanes and -Si-O-N=C⟨ terminated polydimethylsiloxanes such as acetone oxime-terminated polydimethylsiloxanes having the terminal group

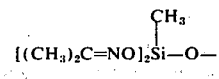

which are crosslinkable by moisture.

The dyestuffs of the invention are useful to impart color to silicone polymers that are molded and cured to resins, for example, as moldings and gaskets. The moldings and gaskets maintain the imparted color and do not expel the dyestuff. The color may be for decorative purposes or for coding purposes. Concentrations of the dyestuff in the silicone polymer may range from about 0.01 to about 5% and preferably from about 0.5 to 2% by weight whereon; in the absence of fillers, clear transparent colored polymers are obtained. A particularly useful application of the dyestuffs of the invention is to impart color to silicone polymers that are used to provide release layers such as are used in pressure sensitive tapes. Release liner papers, films, or other surfaces may be coated with a solution containing about 3 to 10% curable silicone polymer and about 0.5 to about 2% of a silicon polymer-compatible dyestuff of the invention, the coating dried, and allowed to cure. The presence or lack of uniformity in the coating thickness is readily detected by observing either by eye or by instrument any variations in color density.

The silicone polymers into which the silicone polymer-compatible dyestuffs of the invention may be incorporated may also contain fillers and pigments including calcium carbonate, titanium dioxide, zinc oxide, clay, quartz flour, glass fibers, metal fibers, and the like.

The following examples are illustrative of the invention and the preparation of cross-linked silicone-compatible tris(trimethylsilyloxy)silylalkylaminosulfonyl dyestuffs, but are not intended in any way to limit the scope thereof.

EXAMPLE 1

A 1-liter 3-neck flask fitted with mechanical stirrer, thermometer, and condenser with drying tube is charged with 49.3 g. copper phthalocyaninetetrasulfonylchloride salt mixture containing 49.3% copper phthalocyaninetetrasulfonylchloride (0.025 moles) (prepared as described hereinbelow)

200 ml. dry pyridine, and 38 g. 3-tris(trimethylsilyloxy)silylpropylamine (0.107 moles) (prepared as described hereinbelow).

The mixture is heated to 60° C. and held at 57° to 60° C. for 4 hours. The mixture is transferred to a stripping flask and the volatiles removed by heating to 60° to 65° C. at a pressure of 1 mm. The concentrate is taken up in heptane (about 500 ml.) and washed repeatedly with aqueous sodium chloride solution (5 parts of saturated aqueous sodium chloride and 1 part of water) to remove pyridine hydrochloride. A few drops of 40% sodium hydroxide is useful in breaking emulsions that may form. The washed heptane solution is dried over anhydrous sodium sulfate, filtered and the heptane removed by heating under vacuum (0.5 mm.). There is obtained 56 g. of blue-black coarse flaky powder. (Theoretical is 55 g.)

Calculated for $C_{80}H_{148}N_{12}O_{20}Si_{16}S_4$: Cu, 2.8% Si, 20.1; S, 5.17%. Found: Cu, 2.6%; Si, 18.5; S, 5.3%.

Similar dyestuffs are obtained when cobalt or nickel phthalocyaninetetrasulfonylchloride is used in place of copper phthalocyaninetetrasulfonylchloride in equivalent amounts.

The procedure of Example 1 is repeated using in place of copper phthalocyaninetetrasulfonylchloride, an equivalent amount of indigotetrasulfonylchloride (produced by heating the tetrasodium salt of indigo tetrasulfonic acid with chlorosulfonic acid and then treating with thionylchloride and isolating the chlorosulfonated product in accordance with known procedures). There is obtained the dyestuff tetra[tris(trimethylsilyloxy)silylpropylaminosulfonyl]indigo which has a reddish blue color and is compatible with crosslinked silicone polymers.

The procedure of Example 1 is repeated using an equivalent amount of thioindigotetrasulfonylchloride (produced by heating thioindigo with chlorosulfonic acid and then treating with thionylchloride and isolating the chlorosulfonated product in accordance with well known procedures) in place of the copper phthalocyaninetetrasulfonylchloride. The dyestuff tetra[tris(trimethylsilyloxy)silylpropylaminosulfonyl]thioindigo is obtained. It has a reddish orange color and is compatible with crosslinked silicone polymers.

N-(tris(trimethylsiloxy)silylpropane 4-azobenzenesulfonamide is prepared by reaction of the azobenzenesulfonyl chloride with the silyl amide by the above procedures. It colors crosslinked Dow-Corning silicone polymer C-4-2045 a bright yellow.

Metal phthalocyaninetetrasulfonylchlorides are prepared as exemplified by the following description of the preparation of copper phthalocyaninetetrasulfonylchloride. A 1-liter 4-neck flask fitted with mechanical stirrer, thermometer, drying tube, and solids addition flask for introduction of solids into the flask without allowing atmospheric moisture to enter is charged with 375 ml. of chlorosulfonic acid and the solids addition flask with 50 g of Monastral Fast Blue BC (Trade Name for copper phthalocyanine) (Color Index 74160). The flask contents are stirred and the copper phthalocyanine is added over ½ hour during which time the temperature rises to 55° C. The mixture is heated to 140° C during 1 hour and held at this temperature for 4 additional hours, then allowed to cool. The solids addition flask is replaced by a dropping funnel and at 80° C. 31 ml. of thionylchloride is added dropwise over a period of 2 hours. The mixture is cooled to about 20° C. and drowned in ice-salt mixture. The solid is collected and washed with saturated salt solution until the filtrate tests free from sulfate ion. After drying in vacuo over anhydrous calcium chloride, there is obtained 95.8 g. of product containing 49.3% copper phthalocyaninetetrasulfonylchloride by analysis.

Tris(trimethylsiloxy)silylpropylamine is prepared by charging a Todd still with 17.7 parts of 3-trimethoxysilylpropylamine (available from Union Carbide Corporation under the trade code name "A1100"), 88.8 parts bis(trimethylsilyl)oxide (available from Dow Corning Corporation under the trade code name DC200), and 1 part of a 20% solution of tetramethylammonium hydroxide. The still pot is heated to 137° C. and set to maintain this temperature. At a reflux ratio of 50 to 1, 22.7 parts of distillate is removed in about 16 hours, the head temperature rising from 64° to 99° C. There is then added 1 part of Cab-O-Sil to the still pot (to neutralize the tetramethylammonium hydroxide) and the distillation continued at about 1 mm. pressure and a reflux ratio of 5 to 1, collecting the fraction boiling 72° to 76° C. Water in an amount equivalent to the methoxy groups present in the distillate (as determined by chromatographic absorption) (approximately 1.5 parts) is added to the distillate and the mixture refluxed for 12 hours. The refluxed material is then subjected to fractional distillation and the portion boiling 74° C at 0.95 mm. collected. There is obtained 11.2 parts of tris(trimethylsiloxy)silylpropylamine having a purity of 96% by chromatographic absorption, a density of 0.891 g./ml. at 25° C., and a refractive index at 25° C of 1.4117.

EXAMPLE 2

This and the following examples illustrate the preparation of tris(trimethylsilyloxy)silylakylaminoquinones.

A flask equipped with a reflux condenser is charged with:
 1.92 parts quinizarin (1,4-dihydroxyanthraquinone),
 0.24 parts zinc dust,
 7.00 parts 3-tris(trimethylsilyloxy)silylpropylamine, and
 40 parts n-butanol The mixture is heated at reflux for 6½ hours, cooled, taken up in several volumes of heptane, filtered to remove inorganics, and the volatiles removed by heating on a steam bath. There is obtained 3.5 parts of a deep purple-blue gum which is chromatographed on $SiO_2$ using ethylacetate as the developer to yield 2 major components shown by infrared analysis to be

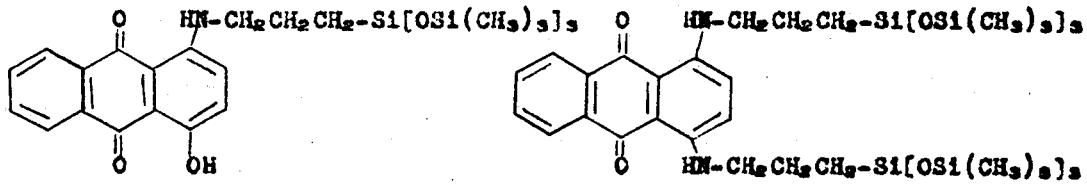

The gum itself is soluble in common organic solvents including benzene, toluene, ethylacetate, tetrahydrofuran, and solicone oils and greases. Samples of crosslinked silicone polymer placed in solutions of either dye are deeply colored blue by dye which diffuses into the polymer.

EXAMPLE 3

A flask equipped with a reflux condenser is charged with:
 4.12 parts leucoquinizarin (2,3-dihydro-1,4-dihydroxyanthraquinone)
 15.0 parts 3-tris(trimethylsiloxy)silylpropylamine, and
 35 parts tetrahydrofuran,
and the mixture refluxed for 3½ hours. Volatiles are removed by heating the mixture under vacuum on a water bath to yield a residue of 15.6 parts of crude leuco dye that is taken up in 80 parts of nitrobenzene, 0.2 parts of piperidine is added and the mixture is heated 15 minutes at 100° C. to oxidize the leuco dye. Excess nitrobenzene is then stripped by heating to 130° C. under vacuum and further traces removed by taking the dye up in heptane and again stripping under vacuum. There is obtained 13.1 parts of pure blue dye containing only 1 major component. Infra red spectroscopy confirms the presence of silicone groups.

The leuco dye is also oxidized by exposing the tetrahydrofuran solution to air for about 12 hours followed by isolating the dye by stripping off the tetrahydrofuran.

The dye is soluble in common organic solvents. A solution of 1 part of dye in 100 parts of a moisture-curing single part polydimethylsiloxane is cast as a film and provides transparent deep blue cross-linked silicone polymer films. This polymer cures under the influence of atmospheric moisture without being affected by the presence of the dye which is not expelled from the film even after prolonged aging of the film.

EXAMPLE 4

The procedure of Example 3 is repeated using 3.8 parts of leuco-naphthazarin (dihydro-5,8-dihydroxynaphthoquinone-1,4) in place of the leucoquinizarin and there is obtained a cyan colored product soluble in common solvents, silicone oils and silicone greases. A solution of 1 part of dye in a moisture-curing single part dimethylsiloxane is cast as a film yielding a transparent deeply colored cyan cross-linked silicone film.

EXAMPLE 5

2,5-Bis[tris(trimethylsilyloxy)silylproplaminobenzoquinone-1,4] is prepared by a reaction rather like that above.

A reaction flask equipped with a condenser is charged with:

3.24 parts benzoquinone 7.06 parts tris(trimethylsilyloxy)silylpropylamine, and 40 parts ethanol.

The mixture is heated to reflux and held at reflux for about 15 minutes and then stripped of solvent by heating under reduced pressure on a steam bath. The crystalline mass is taken up in heptane, filtered to remove hydroquinone, and the heptane stripped from the filtrate by heating under reduced pressure on a steam bath. The product obtained is soluble in common solvents. When dissolved in a moisture curing single part polydimethylsiloxane and cast as a film, transparent yellow crosslinked silicone polymer films are obtained.

EXAMPLE 6

To 100 parts of a hydroxy-terminated polydimethylsiloxane, believed to have a molecular weight of about 30,000 to 50,000, (available commercially under the designation L-9000 from Union Carbide Corp.) is added 1 part of the tris(trimethylsiloxy)silylpropylamino substituted quinizarin dye prepared as described in Example 3 and 0.2 parts of stannous octoate. The mixture is stirred to dissolve the components. There is added 3 parts of tetraethyl silicate to the solution and the solution cast as a film. The film cures with the elimination of ethanol to a transparent deep blue crosslinked silicon polymer film. Even after prolonged aging of the film, dye is not expelled from the film.

What is claimed is:

1. An indigo dyestuff of the formula:

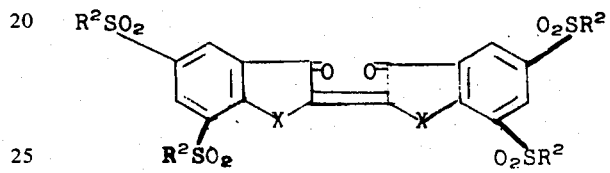

wherein X is —NH— or —S— and $R^2$ is tris(trimethylsilyloxy)silylalkylamino of the formula

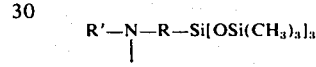

in which R is straight or branched chain unsubstituted alkylene of 1–6 carbon atoms and R' is hydrogen or unsubstituted lower alkyl of 1 to 6 carbon atoms.

* * * * *

UNITED STATES PATENT AND TRADEMARK OFFICE
CERTIFICATE OF CORRECTION

PATENT NO. : 3,920,695
DATED : November 18, 1975
INVENTOR(S) : Carl M. Smith et al It is certified that error appears in the above-identified patent and that said Letters Patent are hereby corrected as shown below:

Abstract, lines 1-2, "tris(trimethylsilyloxy)-silyalkylamino" should read as -- tris(trimethylsilyloxy)-silylalkylamino -- .

Column 3, line 31, "whgich" should read as -- which -- .

Column 3, line 46, "4-tris(trimethylsiloxy)-silybutylamine" should read as -- 4-tris(trimethylsiloxy)-silylbutylamine -- .

Column 12, line 2, "74°C" should read as -- 74 to 78°C -- .

Signed and Sealed this

Fourteenth Day of September 1976

[SEAL]

Attest:

RUTH C. MASON
*Attesting Officer*

C. MARSHALL DANN
*Commissioner of Patents and Trademarks*